Patented Mar. 7, 1950

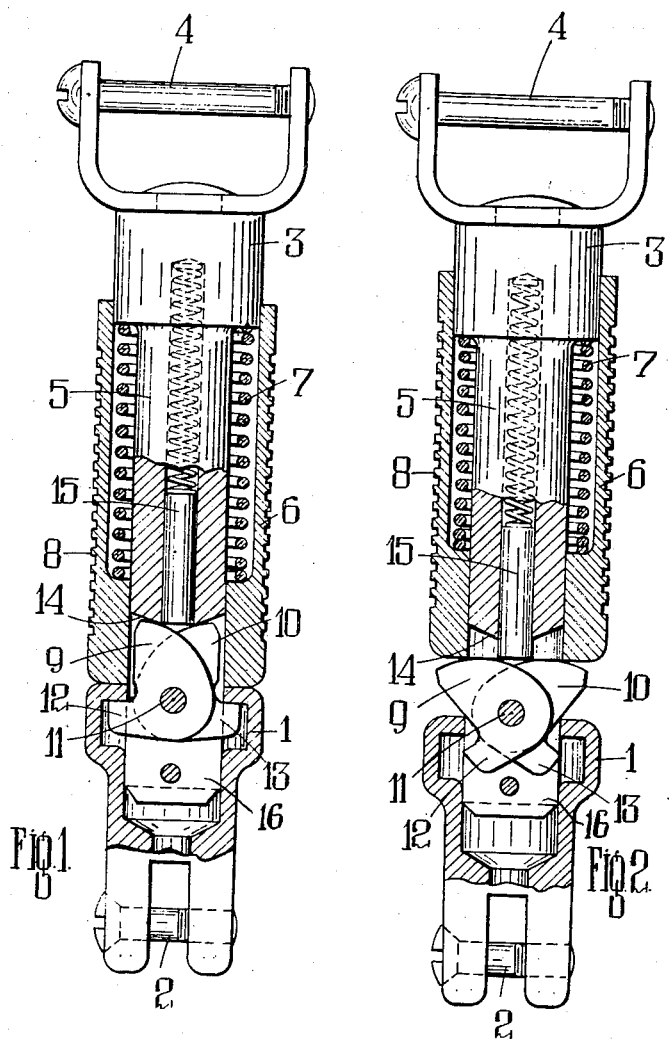

2,499,712

UNITED STATES PATENT OFFICE 2,499,712

RAPID RELEASABLE COUPLING

Fullerton George Gordon Armstrong, near Dorchester, England

Application February 21, 1947, Serial No. 730,073
In Great Britain November 14, 1941

Section 1, Public Law 690, August 8, 1946
Patent expires November 14, 1961

2 Claims. (Cl. 287—103)

1

The present invention relates to an improved rapid releasable coupling of the type in which one of the two members to be coupled consists of a central element movable relatively to a spring controlled outer sleeve, which element has pivoted thereon a pair of fingers, each having a shoulder, which pivotal fingers, on engagement with the edges or a bounding wall of a socket in the other member, are automatically angularly displaced into a position in the rear of said edges to be maintained by longitudinally displaceable locking means in abutting relationship with said fingers.

In devices of this type where the fingers are pivotally mounted on a plunger and are held within a sleeve displaceable against spring pressure on the plunger to release the fingers, the end of the said sleeve, when released, will bear on the rear side of the fingers and hold these in position for re-engagement of the coupling if these fingers have not been displaced since the uncoupling.

According to the present invention a spring pressed plunger is provided adapted to engage the pivoted fingers and maintain these in the correct position for re-assembly even when the spring controlled sleeve is withdrawn relatively to the central element carrying the fingers.

The invention is further described with reference to the accompanying drawings, in which:

Fig. 1 is a sectional elevation showing the device partly in section with the parts in the locking position, Fig. 2 is a corresponding view with the parts in the unlocked position.

The coupling consists of two components, one hollow socket 1 adapted to be coupled by a pin or rivet 2 to any part requiring to be released instantaneously, such as a parachute or a bomb, and a component 3 adapted to be connected by a pin or rivet 4 to another object, such as an aircraft, purely by way of example.

The component 3 comprises a central element in the form of a cylindrical member bifurcated at its lower end to provide a slotted portion between which central element 5 and an outer sleeve 6 is disposed a compression spring 7. This outer sleeve 6 can be knurled or grooved, as shown at 8 to provide a good finger grip. A pair of cam shaped pawls or fingers 9 and 10 are pivoted at 11 within the slotted end 16 in the central element 5 and have stop shoulders 12, 13, engaging within the socket 1.

The upper end of the slot in the central ele-

2 ment 5 is bevelled, as shown at 14 to restrict movement of the pawls beyond the position shown, whilst a spring pressed plunger 15 is disposed centrally within the central element 5 bearing on the top end of the pawls 9, 10, to maintain these in the correct position for reassembly after the device has been released, as shown in Fig. 2.

In order to release the coupling, the outer sleeve 6 will be drawn up relatively to the component 3, against the spring 7, thus allowing the pawls to come into the position shown in Fig. 2.

I declare that what I claim is:

1. A component for a rapid releasable coupling consisting of a spring controlled outer sleeve, a central element movable relatively to said sleeve, a pair of fingers pivoted to said element, a shoulder on each finger, and a central spring pressed plunger engaging the top of said fingers to hold these in correct position for re-assembly when the said sleeve is withdrawn against its spring relatively to the element carrying the fingers.

2. A rapid releasable coupling consisting of a first part formed of a spring controlled outer sleeve, a central element movable relatively within said sleeve and bifurcated at its lower end to provide a slotted portion the inner end of which is bevelled, a pair of fingers pivoted to said central element within said slotted portion, a stop shoulder on one end of each finger, a cam shaped pawl on the opposite end of each finger co-operating with the bevelled inner end of the slotted portion of said central element, a central spring pressed plunger engaging the cam shaped pawl ends of said fingers to hold these in correct position for re-assembly when the said sleeve is withdrawn against its spring relative to the central element carrying the fingers, and a second part comprising a recessed socket, an inwardly directed annular flange forming part of and defining the upper wall of said socket to receive the stop shoulders of the said fingers in locked relationship therewith, the inner edge of said flange engaging the sides of the fingers to turn them about the pivots when said socket part is displaced axially relative to and toward said first part until the cam shaped pawls engage within the end of the spring controlled outer sleeve and the stop shoulders are lockingly accommodated beneath the annular flange of the recessed socket.

FULLERTON GEORGE GORDON
ARMSTRONG.

No references cited.